(No Model.)
H. E. BULLOCK.
VEGETABLE OR FRUIT CRATE.
No. 507,991. Patented Nov. 7, 1893.
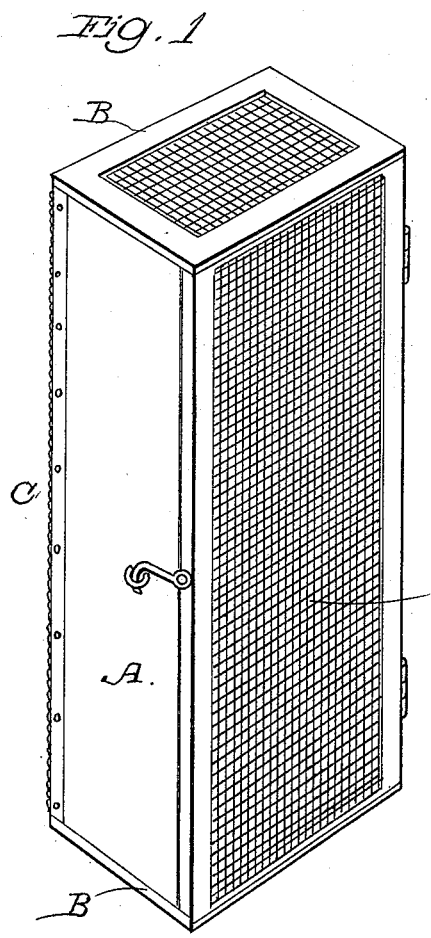
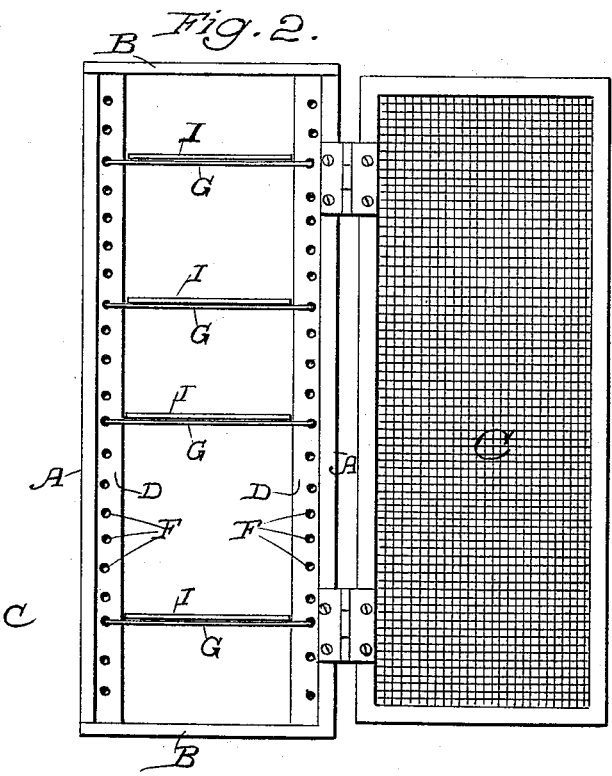
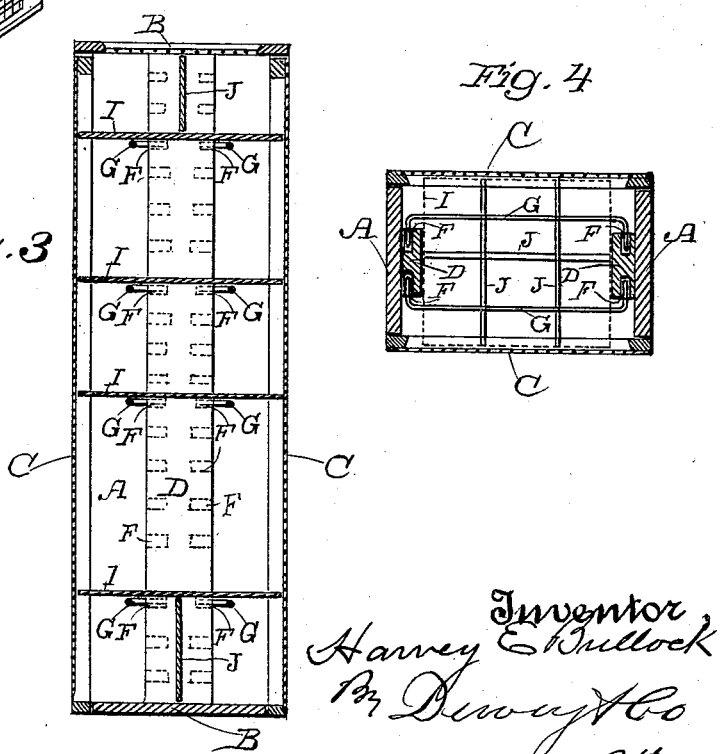
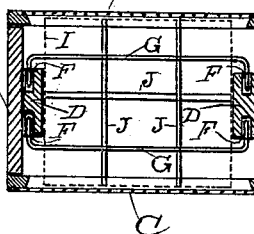
Witnesses,
Inventor,
Harvey E. Bullock
By Dewey & Co
attys

UNITED STATES PATENT OFFICE.

HARVEY E. BULLOCK, OF OAKLAND, CALIFORNIA.

VEGETABLE OR FRUIT CRATE.

SPECIFICATION forming part of Letters Patent No. 507,991, dated November 7, 1893.

Application filed June 22, 1893. Serial No. 478,479. (No model.)

*To all whom it may concern:*

Be it known that I, HARVEY E. BULLOCK, a citizen of the United States, residing at Oakland, Alameda county, State of California, have invented an Improvement in Vegetable or Fruit Crates; and I hereby declare the following to be a full, clear, and exact description of the same.

My invention relates to a crate for packing and transportation of vegetables, fruit and other perishable or delicate substances.

It consists in certain details of construction which will be more fully explained by reference to the accompanying drawings, in which—

Figure 1 is an exterior, perspective view of my crate. Fig. 2 is a front view of the interior, with the door opened. Fig. 3 is a vertical transverse section. Fig. 4 is a horizontal section.

The object of my invention is to provide a means for storage and transmission of delicate, perishable fruits and other similar substances, in which the containing spaces may be sub-divided to any desired extent, the articles separated from each other, and a perfect ventilation through the whole established.

In the construction of my crate, I employ two closed sides A A, and one or both ends B, also closed. These sides and ends may be made of wood united together in any suitable or desirable manner for strength, and the top or upper end is preferably perforated or cut away so as to receive a wire gauze or perforated plate for ventilating purposes, or the whole of the upper end may be made of this material, with sufficient intervening strengthening strips to retain the shape of the crate. The other two sides C C are formed with wire gauze, perforated, or foraminous material, to allow a free circulation of air through them. One of these sides preferably forms a door or cover which is hinged to one of the sides A, and adapted to close and be locked or secured whenever the crate is filled.

In the present construction, I have shown my crate as adapted to preferably stand upon one of the closed ends, but if desired or necessary, it may lie upon either of its sides.

Upon the inside of the crate and adjacent to the sides A A are the supplemental strips D, which are fixed to the sides A and extend from the bottom to the top of the crate. These sides are of less width than that of the sides A, and the edges have holes or slots F formed in them which are adapted to receive the bent rods G, one of which is inserted in the openings upon each side and upon the same horizontal plane as when the crate stands upon end, and these rods serve for the support of the removable shelves I. These shelves are of sufficient width to pass between the uprights D between which they slide, and of such a length that they extend from one of the netting sides C to the other when the crate is closed. The supporting rods may be placed at any desired distance from the ends and from each other, and the diaphragms which rest upon them are thus so arranged as to make spaces of any desired size, either regular or irregular, so that, if necessary, many different kinds and sizes of fruit may be carried in the same crate, and all of them securely packed.

In the case of berries or small fruits, the spaces between the diaphragms or between either of these and the ends, are preferably made small, so that the depth of berries or fruit will not be so great as to crush by their own weight. In addition to this I employ a series of transverse vertical partitions which are adapted to rest upon the horizontal ones and to approximately fill the space between the sides and the bottom and the top, so that the fruit contained in any one compartment will be subdivided into as many smaller sections as its character makes necessary. For peaches and similar easily bruised fruits, the compartments may be larger than those for berries, while for oranges or fruit which is not easily bruised, the whole compartment may remain open, and of such depth as to receive one or more layers of the fruit.

The partitions within the interior of the crate are always easily removable so that if the crate is to be arranged for any particular varieties of fruit or vegetables or for a number of different varieties, it is a matter of but a few moments to remove the supporting rods and partitions, and to rearrange the spaces of the requisite size.

Having thus described my invention, what I claim as new, and desire to secure by Letters Patent, is—

1. A fruit and vegetable crate, consisting of two closed sides and a closed bottom, and two foraminous or perforated sides and perforated top, one of which sides forms a door or cover of the crate; the vertically disposed supports fixed upon opposite closed sides, and partitions adjustably supported upon said supports and extending from one foraminous side to the opposite one, substantially as herein described.

2. A fruit or vegetable crate having two opposite closed sides and a closed bottom, the other two sides and top made open or foraminous, one of which open sides is hinged and forms a door or cover of the crate, interior vertical strips fixed upon the opposite closed sides having slots made in them for the reception of supporting rods, diaphragms fitting the space between these strips and extending between the opposite foraminous sides, said rods and diaphragms being adjustable with relation to each other and to the ends of the crate, substantially as herein described.

3. A crate consisting of two opposite closed sides, a closed bottom, two foraminous sides and a top, vertical interior strips fixed upon the closed sides having a width less than that of said closed sides, slots or holes made in the edges of these strips and bent rods, the ends of which fit said slots at the opposite sides of the strips, diaphragms having a length equal to the distance between the foraminous sides, and a width equal to that of the distance between the side perforated strips, said rods and diaphragms being adjustable with relation to each other and the ends of the crate and intermediate vertical partitions resting upon the diaphragms and subdividing the spaces between them, substantially as herein described.

In witness whereof I have hereunto set my hand.

HARVEY E. BULLOCK.

Witnesses:
S. H. NOURSE,
J. A. BAYLESS.